United States Patent [19]

Dogan et al.

[11] Patent Number: 5,459,668

[45] Date of Patent: Oct. 17, 1995

[54] METHOD AND APPARATUS FOR SIGNAL ANALYSIS EMPLOYING A VIRTUAL CROSS-CORRELATION COMPUTER

[75] Inventors: Mithat C. Dogan, Los Angeles; Jerry M. Mendel, Culver City, both of Calif.

[73] Assignee: University Of Southern California, Los Angeles, Calif.

[21] Appl. No.: 73,148

[22] Filed: Jun. 4, 1993

[51] Int. Cl.⁶ .................................................. G01C 21/00
[52] U.S. Cl. ....................... 364/456; 364/728.03; 342/153
[58] Field of Search ............................... 364/807, 724.16, 364/456, 460, 516, 517, 724.01, 728.03, 572, 574, 800, 808; 342/147, 153, 195; 367/124, 129

[56] References Cited

U.S. PATENT DOCUMENTS 4,750,147  6/1988  Roy, III et al. ......................... 364/807
5,255,210  10/1993  Gardner et al. ......................... 364/574

Primary Examiner—Emanuel T. Voeltz
Assistant Examiner—Craig Steven Miller
Attorney, Agent, or Firm—Christie, Parker & Hale

[57] ABSTRACT

The invention includes an arrangement of actual sensors in an antenna array with a computation of higher-order statistics to provide virtual second order statistics corresponding to virtual elements in the array; employment of the actual and virtual elements of the array for covariance based direction finding; and, with the addition of a separate sensor spaced from the main array, suppression of non-Gaussian measurement noise. This is accomplished employing cross-correlation of the virtual sensors or alternately calibrating the existing actual array employing cross-correlation of the array and it's virtual sensors.

9 Claims, 15 Drawing Sheets

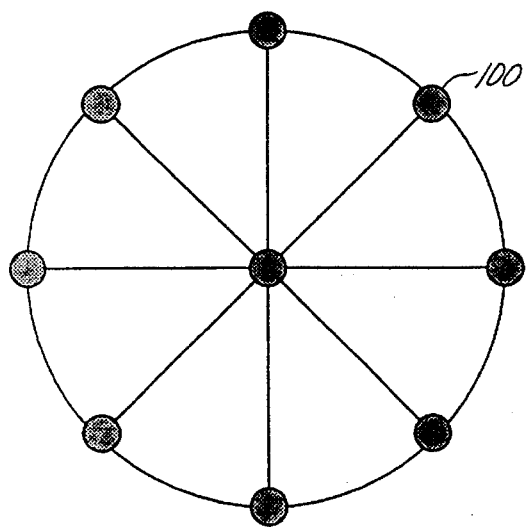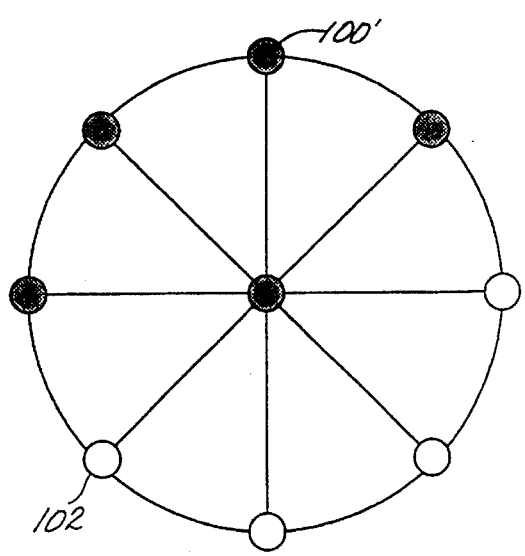
Fig. 10 (a)        Fig. 10 (b)

SET OF VECTORS THAT CAN BE GENERATED IN THIS DIMENSION

METHOD AND APPARATUS FOR SIGNAL ANALYSIS EMPLOYING A VIRTUAL CROSS-CORRELATION COMPUTER

BACKGROUND OF THE INVENTION

1. Field of the Invention

The present invention relates to processing of signals from antenna arrays to provide direction finding for signal sources, suppression of near field interference and noise, extension of the aperture of arbitrary antenna arrays or providing minimum redundancy array design and calibrating antenna arrays without calibration sources. More particularly, the invention includes an arrangement of actual sensors in an antenna array with a computation of higher-order statistics to provide virtual second order statistics corresponding to virtual elements in the array; employment of the actual and virtual elements of the array for covariance based direction finding; and, with the addition of a separate sensor spaced from the main array, suppression of non-Gaussian measurement noise. This is accomplished employing cross-correlation of the virtual sensors or alternatively calibrating the existing actual array employing cross-correlation of the array and its virtual sensors.

2. Prior Art

The use of discrete arrays of sensors as an antenna for receiving signals generated by multiple sources and estimating the parameters of the signals received is well known in the art. Applications of the parameter estimation include source direction finding (often identified as direction of arrival (DOA) of signal wavefronts) or, reversing the known and unknown parameters, applying known signal locations for calibration of an array of sensors of unknown array manifold.

Conventional array processing techniques utilize only second order statistics of received signals. Second-order statistics are sufficient whenever the signals can be completely characterized by knowledge of the first two moments as in the Gaussian case, however, in real applications far field sources may emit non-Gaussian signals. Exemplary of such an application is a communications scenario with multiple receivers. Failure of second-order statistics to completely characterize the signal parameters may be ameliorated by the use of higher-order statistics.

Exemplary of the prior art in array signal processing are the Ph.D. thesis by R. O. Schmidt entitled "A Signal Subspace Approach to Multi-Emitter Location and Spectral Estimation," Stanford University 1981 and U.S. Pat. No. 4,750,147 to Roy, III, et al., issued Jun. 7, 1988. The Multiple Signal Classification (MUSIC) algorithm of Schmidt and the Estimation of Signal Parameters using Rotational Invariance Techniques (ESPRIT) of Roy III employ second order statistics based on an array covariance matrix for establishing the signal parameters. The MUSIC approach requires extensive calibration of the array geometry to allow its proper characterization for use with the algorithms employed in MUSIC. The ESPRIT system alleviates the need for array calibration by employing sensor pairs having known spacing and orientation while allowing variable geometry with respect to the pairs. The ESPRIT system consequently requires doubling the number of sensors with commensurate added cost and merely replaces the problem of calibration of the overall array manifold with the requirement for strict orientation of the sensor pairs in the array.

Both the MUSIC and ESPRIT systems are designated as subspace parameter estimation algorithms. Various methods have been recommended for increasing the capability of such subspace algorithms by the use of higher-order statistics for noise reduction. See, e.g., Shamsunder, S. and Giannakis, G., "Modeling of Non-Gaussian Array Data Using Cumulants", *IEEE Transactions on Signal Processing*, March 1993; Pan, R. and Nikias, C. L., "Harmonic Decomposition Methods in Cumulant Domains", *Proceedings ICASSP '88*, pp. 2356–2359 New York, N.Y., April 1988; and Chiang, H. H. and Nikias, C. L., "The ESPRIT Algorithm With Higher-Order Statistics," *Proceedings Vail Workshop, Higher-Order Spectral Analysis*, pp. 163–168, June 1989. Such applications of higher-order statistics provide techniques for noise reduction/elimination, however, the approches as disclosed in the prior art are supplementary to the conventional array processing techniques.

The present invention overcomes the difficulties of the subspace algorithms and provides an integrated approach to the use of higher-order statistics for direct calculation of estimated parameters as opposed to mere signal correction.

SUMMARY OF THE INVENTION

Estimation of signal parameters employing the present invention is accomplished by a plurality of sensors receiving signal inputs and transferring the sensor measurements to a virtual cross-correlation computer which generates virtual second-order statistics by processing higher-order statistics of available sensor measurements to provide cross-statistics between the real sensors and a set of virtual sensors which are not actually present at desirable locations. The virtual second order statistics are then provided to a standard subspace calculation system for use in parameter estimation in applications such as direction finding (wavefront DOA) and waveform recovery.

In a second embodiment of the invention a separate sensor, remote from the plurality of sensors forming the array, provides an additional signal input to the virtual cross-correlation computer again allowing calculation of virtual second-order statistics based on processing of the higher-order statistics of the available sensors and employing the cross-statistics between the actual sensors computed in the presence of unknown interference wherein the higher-order statistical calculations are insensitive to the interference whereby the resulting virtual second-order statistics are similarly unaffected by the interference. The output of the virtual cross-correlation computer is again provided to a standard subspace algorithm for calculation of desired signal parameters.

A third embodiment of the invention employs as a portion of the plurality of sensor elements a pair of elements having known relative displacement and orientation. Application of the known vector for the displacement and distance of the interrelated sensors allows specification of the virtual sensors in the virtual cross-correlation computer to comprise doublets with the remaining actual sensors having similar displacement and orientation thereby providing "self calibration". The output of the cross-correlation computer is then provided to a standard ESPRIT algorithm for estimation of signal parameters.

In yet another embodiment of the invention a second separate sensor proximate the first separate sensor displaced from the plurality of sensors forming the array is provided with known displacement and orientation relative to the first separate sensor. Signal measurements from the first and second separate sensor are provided to the virtual cross-correlation computer which, with a prior knowledge of the displacement vector of the first and second separate sensor, calculates virtual second order statistics eliminating noise and providing virtual sensor locations corresponding to doublets having displacement vectors from the actual array sensors identical to the displacement vector of the first and second separate sensors. The virtual second order statistics provided by the virtual cross-correlation computer are then employed by a standard ESPRIT algorithm for generation of signal parameters wherein non-Gaussian noise has been eliminated.

BRIEF DESCRIPTION OF THE DRAWINGS

The present invention will be more clearly understood with reference to the following drawings and detailed description.

FIGS. 10a and 10b demonstrate the reduction in sensors available for a circular array pattern employing the present invention to replace actual sensors with virtual sensors;

DETAILED DESCRIPTION

Figure 1:
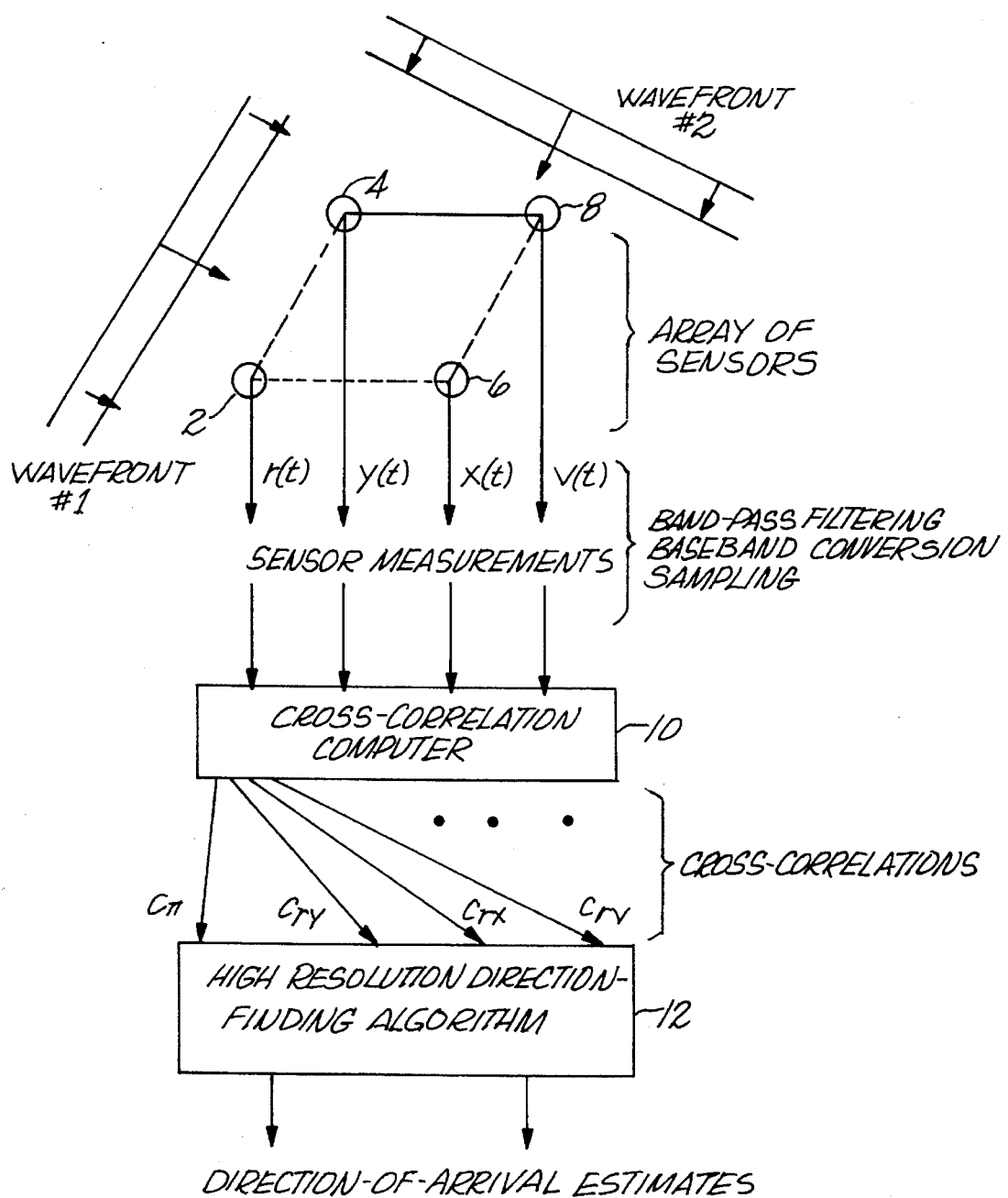
FIG. 1 is a block diagram of a sensor array and signal parameter estimation system employing second order statistics of the prior art.

In the prior art, second-order statistics systems for signal parameter estimation employ covariance matrices for parameter estimation. Using the example of direction finding, wherein the desired signal parameter is direction of arrival of the wavefront, FIG. 1 discloses the elements of a prior art system. Algorithms employed by such systems require the computation of cross-correlations between all sensor elements of the array. As shown in FIG. 1, the array comprises four sensors, 2, 4, 6 and 8 which provide sensor measurements r(t), y(t), x(t) and v(t) respectively, arising from the arrival of signal wavefronts #1 and #2. Band-pass filtering and base-band conversion sampling of the sensor measurements is employed for the data fed to the cross-correlation computer. A cross-correlation computer 10 receives the sensor measurements and calculates the cross-correlations, e.g. $c_{ry}$, for each of the sensors wherein the cross-correlation is defined as $c_{ry} \triangleq E\{r^*(t)y(t)\}$. The cross-correlations are then provided to a high resolution direction finding algorithm 12, which calculates the direction of arrival estimates.

Figure 2:
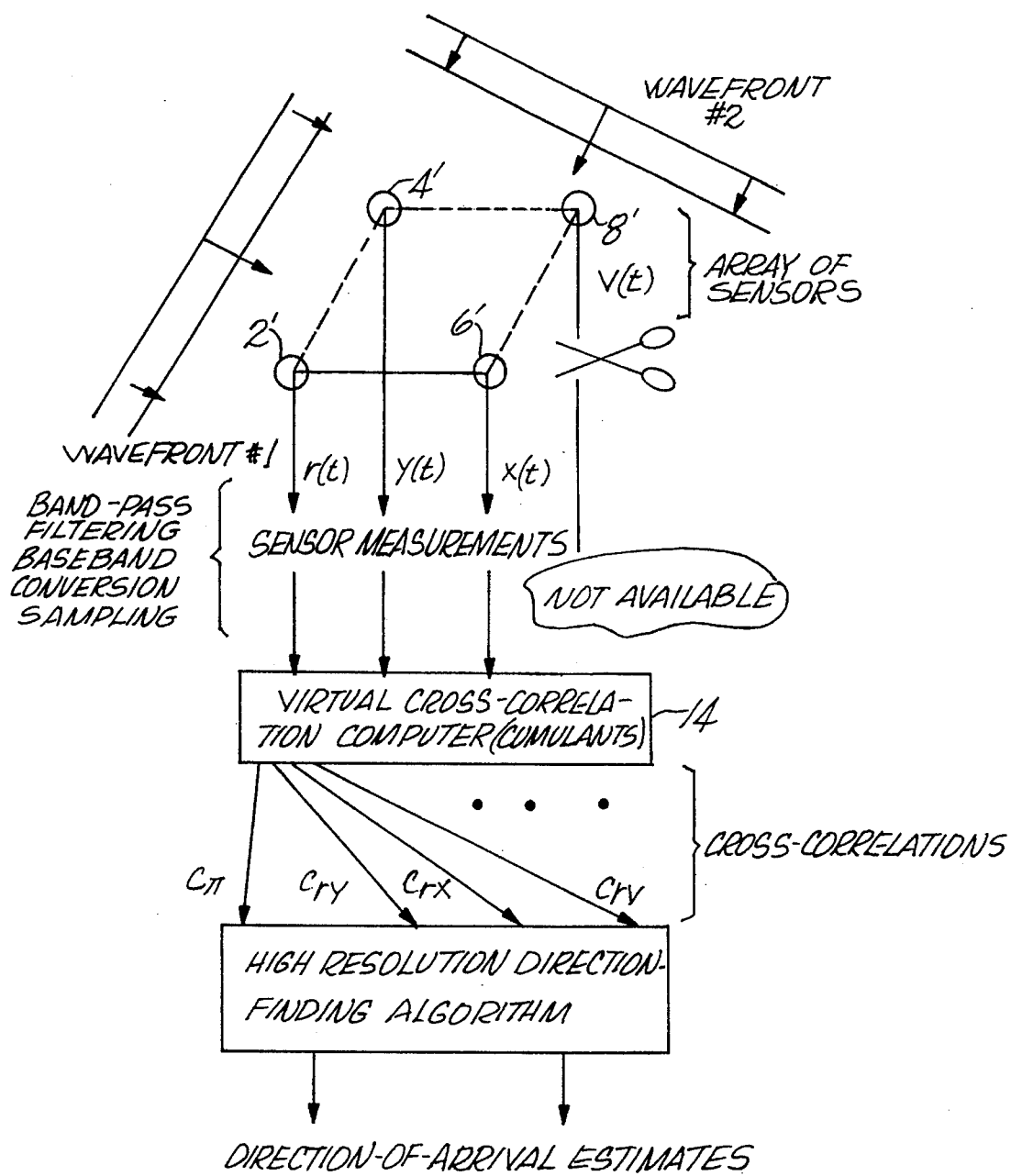
FIG. 2 is a block diagram of a signal parameter estimation system of the present invention employing an array of actual sensors and a virtual cross-correlation computer using higher-order statistics for generation of virtual second order statistics for a virtual sensor to provide cross-correlation data for a standard subspace parameter estimating algorithm.

Referring now to FIG. 2, the present invention is demonstrated in block diagram form. The array receiving the signals represented by wavefront #1 and wavefront #2 now comprises three actual sensors, 2', 4' and 6', which provide relative sensor measurements r(t), y(t) and x(t). The sensor measurements are once again subjected to band-pass filtering, base-band conversion and sampling. The sensor measurements are provided to a virtual cross-correlation computer $(VC^3)^{14}$. The virtual cross-correlation computer provides calculation of higher-order statistics for the three actual sensors, which in turn, allow calculation of second order statistics for a virtual sensor 8' having an effective signal measurement v(t).

The $VC^3$ employs cumulants for calculation of the virtual second order statistics as shown in the following analysis. It should be noted that for the examples shown herein, fourth order cumulants are employed to allow a generalized multidimensional problem. The invention disclosed herein is not limited to fourth order cumulants and may employ lower or higher-order cumulants as constrained by the dimensionality of the signal sources under investigation.

To handle symmetric probability density functions from the sources of interest, fourth order cumulants of the sensor outputs are calculated. Fourth order (zero-lag) cumulants are defined in a balanced way for a signal vector from an array of M sensors defined as $\{r_k(t)\}_{k=1}^{M}$ as follows:

$$\text{cum}\{r_i(t), r_j(t), r_k^*(t), r_l^*(t)\} \triangleq E\{r_i(t) r_j(t) r_k^*(t) r_l^*(t)\} - \quad (1)$$

$$E\{r_i(t) r_j(t)\} E\{r_k^*(t) r_l^*(t)\} - E\{r_i(t) r_k^*(t)\} E\{r_j(t) r_l^*(t)\} -$$

$$E\{r_i(t) r_{l^*}(t)\} E\{r_j(t) r_k^*(t)\}$$

for $(i, j, k, l) \in \{1, \ldots, M\}$

This definition is consistent with the definition of cross-covariance which can be expressed as $E\{r_i(t) r^*_j(t)\}$ and has only two arguments. The properties of cumulants for order ($n > 2$) can be defined as follows:

[CP1] If $\{\sigma_i\}_{i=1}^n$ are constants and $\{x_i\}_{i=1}^n$ are random variables, then $$\text{cum}(\sigma_1 x_1, \sigma_2 x_2, \ldots, \sigma_n x_n) = \left(\prod_{i=1}^n \sigma_i\right) \text{cum}(x_1, x_2, \ldots, x_n) \quad (2)$$

[CP2] Cumulants are additive in their arguments, $$\text{cum}(x_1 + y_1, x_2, \ldots, x_n) = \text{cum}(x_1, x_2, \ldots, x_n) + \text{cum}(y_1, x_2, \ldots, x_n) \quad (3)$$

[CP3] If the random variables $\{x_i\}_{i=1}^n$ are independent of the random variables $\{y_i\}_{i=1}^n$, then $$\text{cum}(x_1 + y_1, x_2 + y_2, \ldots, x_n + y_n) = \text{cum}(x_1, x_2, \ldots, x_n) + \text{cum}(y_1, y_2, \ldots, y_n) \quad (4)$$

[CP4] Cumulants suppress Gaussian noise of arbitrary covariance i.e., if $\{z_i\}_{i=1}^n$ are Gaussian random variables independent of $\{x_i\}_{i=1}^n$ and $n > 2$, we have $$\text{cum}(x_1 + z_1, x_2 + z_2, \ldots, x_n + z_n) = \text{cum}(x_1, x_2, \ldots, x_n) \quad (5)$$

[CP5] If a subset of random variables $\{x_i\}_{i=1}^n$ are independent of the rest, then $$\text{cum}(x_1, x_2, \ldots, x_n) = 0 \quad (6)$$

[CP6] The permutation of the random variables does not change the value of the cumulant.

Figure 3:
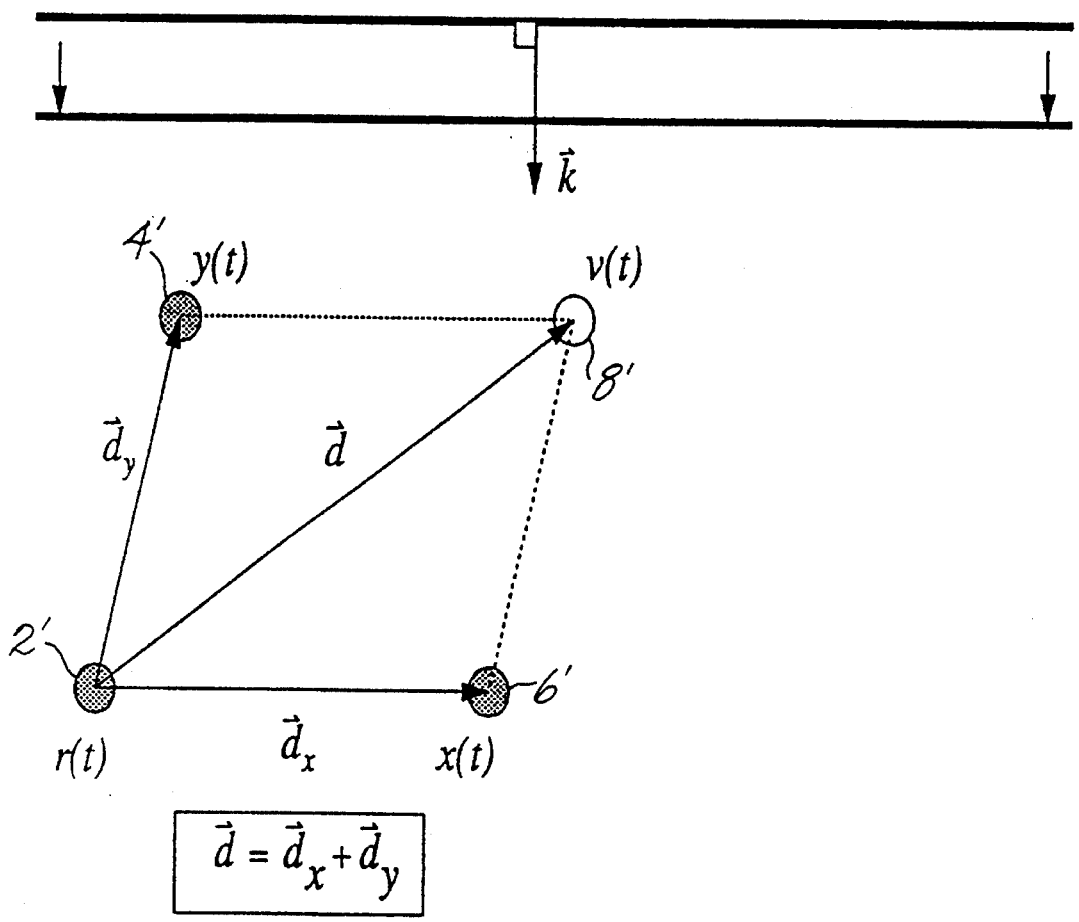
FIG. 3 is a diagram of the vector relationships of the actual sensors in the array, a virtual sensor created by calculation of higher-order statistics and the impinging wavefront.

Referring to FIG. 3, the elements of the array of FIG. 2 are separately shown. For convenience, the actual elements of the array 2', 4' and 6' are assumed to be isotropic and the sources that illuminate the array are assumed to be statistically independent. In this case, we can further assume the presence of a single source having a signal s(t) without loss of generality based on [CP3] above. The signal source has a propagation vector $\vec{k}$ where $\vec{k}$ equals $\vec{k} = k_x \hat{a}_x + k_y \hat{a}_y$ ($\hat{a}_x$ and $\hat{a}_y$ denote the unit vectors along the x and y axis respectively for the propagation vector). The propagation vector $\vec{k}$ further has power $\sigma_x^2$ and forth-order cumulant $\gamma_{4,s}$ Computation of the cross-correlation (ignoring noise effects) between real signal r(t) and virtual signal v(t), $E\{r^*(t) v(t)\}$, assuming the reference point to be the position of the sensor that records r(t), is defined for the purposes of the present invention as a "virtual" cross-correlation since no sensor exists for the generation of signal v(t). Because $r(t) = s(t)$ then, $$x(t) = s(t) \exp(-j \vec{k} \cdot \vec{d}_x)$$

$$y(t) = s(t) \exp(-j \vec{k} \cdot \vec{d}_y)$$

$$v(t) = s(t) \exp(-j \vec{k} \cdot \vec{d})$$

It follows that the directional information provided by the correlation operation is embedded in the dot product, $\vec{k} \cdot \vec{d}$, (see FIG. 3) i.e., $$E\{r^*(t) v(t)\} = \sigma_s^2 \exp(-j \vec{k} \cdot \vec{d}) \quad (7)$$

The source power $\sigma_s^2$ does not provide any directional information. The information recovered by the cross-correlation of two sensor outputs can therefore be represented by the vector extending from the conjugated sensor, to the unconjugated sensor. Cross-correlation is therefore a vector in the geometrical sense. Examining fourth-order cumulants based on the geometrical interpretation of cross-correlation as described above we note, $$\text{cum}(r^*(t), x(t), r^*(t), y(t)) = \text{cum}(s^*(t), s(t) \exp(-j \vec{k} \cdot \vec{d}_x), s^*(t) \exp(-j \vec{k} \cdot \vec{d}_y)) \quad (8)$$

and using [CP1] we obtain:

$$\text{cum}(r^*(t), x(t), r^*(t), y(t)) = \gamma_{4,s} \exp(-j \vec{k} \cdot \vec{d}_x) \exp(-j \vec{k} \cdot \vec{d}_y) = \gamma_{4,s} \exp(-j \vec{k} \cdot \vec{d}) \quad (9)$$

And by comparing Equations (7) and (9), the following may be observed:

$$\text{cum}(r^*(t), x(t), r^*(t), y(t)) = \frac{\gamma_{4,s}}{\sigma_s^2} E\{r^*(t) v(t)\} \quad (10)$$

Equation (10) relates the fourth-order statistic provided by the cumulant to a second-order statistic typically associated with a cross-correlation. It should be noted that the cross-correlation identified on the right hand side of Equation (10) employs the virtual signal v(t) while the left side of Equation (10) employs only real signals. It is therefore possible to recover the directional information of signal v(t) without requiring the use of an actual sensor to measure the v(t). From the development of Equation (10) above it is demonstrated that fourth-order cumulants may be interpreted as an addition of two vectors each extending from a conjugated channel to an unconjugated channel. Using principles [CP3] and [CP6] it can be demonstrated that Equation (10) holds for multiple independent sources and the presence of additive colored Gaussian noise. Further [CP6] which claims that permutation of random variables does not change the value of a cumulant merely restates the fact demonstrated in the present analysis that addition of two vectors is a commutative operation.

As shown by the above analysis, the use of cumulants increases the effective aperture of an array without any design procedure or configuration constraints by the addition of virtual sensors. The three elements of the array shown in FIG. 3 are redrawn in FIG. 4 in a lattice structure wherein the three actual sensors, 2', 4', 6' are interconnected by vectors $\vec{d}_x, \vec{d}_y, \vec{d}_z$, respectively. The three actual sensors, as previously described, provide signals r(t), y(t) and x(t). Employing the concept of vector addition previously described for obtaining the positioning of a virtual sensor, the intersection of the lines in the lattice shown in FIG. 4 determine the candidate locations for virtual-sensors. To implement a covariance-like subspace algorithm, it is necessary to compute the cross-correlation of all sensor outputs, actual or virtual. Consequently, the sensors to be used must be connected with a single vector. Through the use of fourth-order cumulants, as previously demonstrated, this constraint is relieved by allowing use of two vectors for connection purposes. These connecting vectors must be selected from the set of vectors that define the lattice. The virtual sensors 20, 22, 24, and 26 shown in FIG. 4 having virtual signals $v_1(t)$, $v_2(t)$, $v_3(t)$, and $v_4(t)$, respectively, comprise the chosen sensors for this example. Note that this choice is not a unique selection. The four virtual and three actual sensors can communicate by two jumps (vector additions). Computation of the cross-statistics is accomplished as follows:

(between actual sensors)

$$E\{r^*(t)y(t)\} = \frac{\sigma_s^2}{\gamma_{4,s}} \text{cum}(r^*(t), y(t), r^*(t), r(t)) \quad (a) \quad (11)$$

(between actual and virtual sensors)

$$E\{r^*(t)v_1(t)\} = \frac{\sigma_s^2}{\gamma_{4,s}} \text{cum}(r^*(t), x(t), r^*(t), y(t)) \quad (b)$$

(between virtual sensors)

$$E\{v_1^*(t)v_3(t)\} = \frac{\sigma_s^2}{\gamma_{4,s}} \text{cum}(y^*(t), x(t), y^*(t), r(t)) \quad (c)$$

Figure 5:
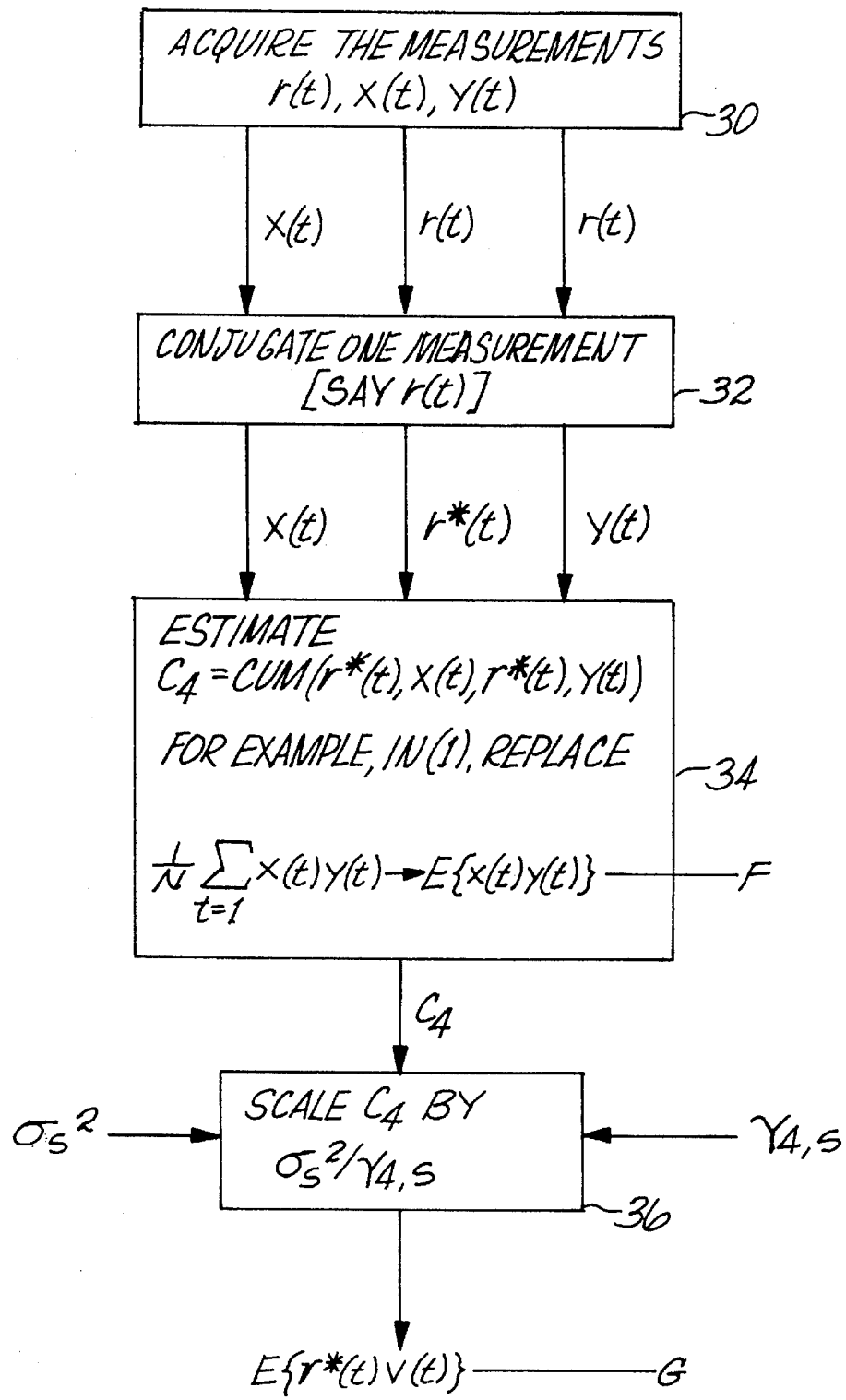
FIG. 5 is a block diagram of an embodiment of the virtual cross-correlation computer of FIGS. 2 and 3.

Referring now to FIG. 5 the elements of the VC³ are shown. The measurements from the actual sensors r(t), x(t), and y(t) are acquired and stored in block 30. One measurement is chosen and conjugated (in the example shown r(t) in block 32). Employing x(t), r*(t) and y(t) the cumulant of Equation 11(b) is estimated in block 34. This estimate, $C_4$, may be derived using several approaches for example:

$$\frac{1}{N} \sum_{t=1}^{N} x(t)y(t) \rightarrow E\{x(t)y(t)\}$$

The estimated cumulant $C_4$ is then scaled by $\sigma_x^2$ and $\gamma_{4,s}$ in block 36 to provide the virtual second-order cross-correlation statistic:

$$E\{r^*(t)v(t)\}$$

Figure 4:
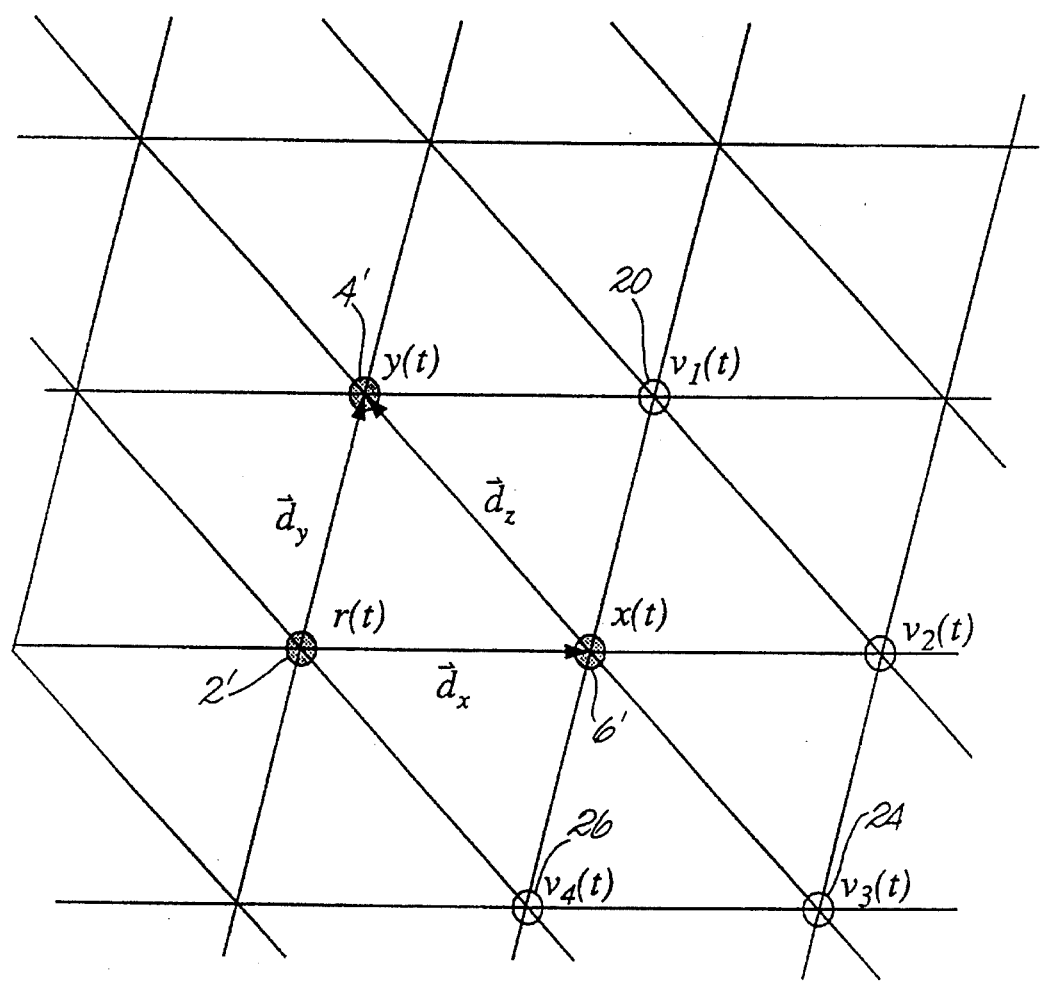
FIG. 4 is a diagram of a virtual aperture extension of an actual array of three sensors to an array employing four virtual and three actual sensors.
Figure 15:
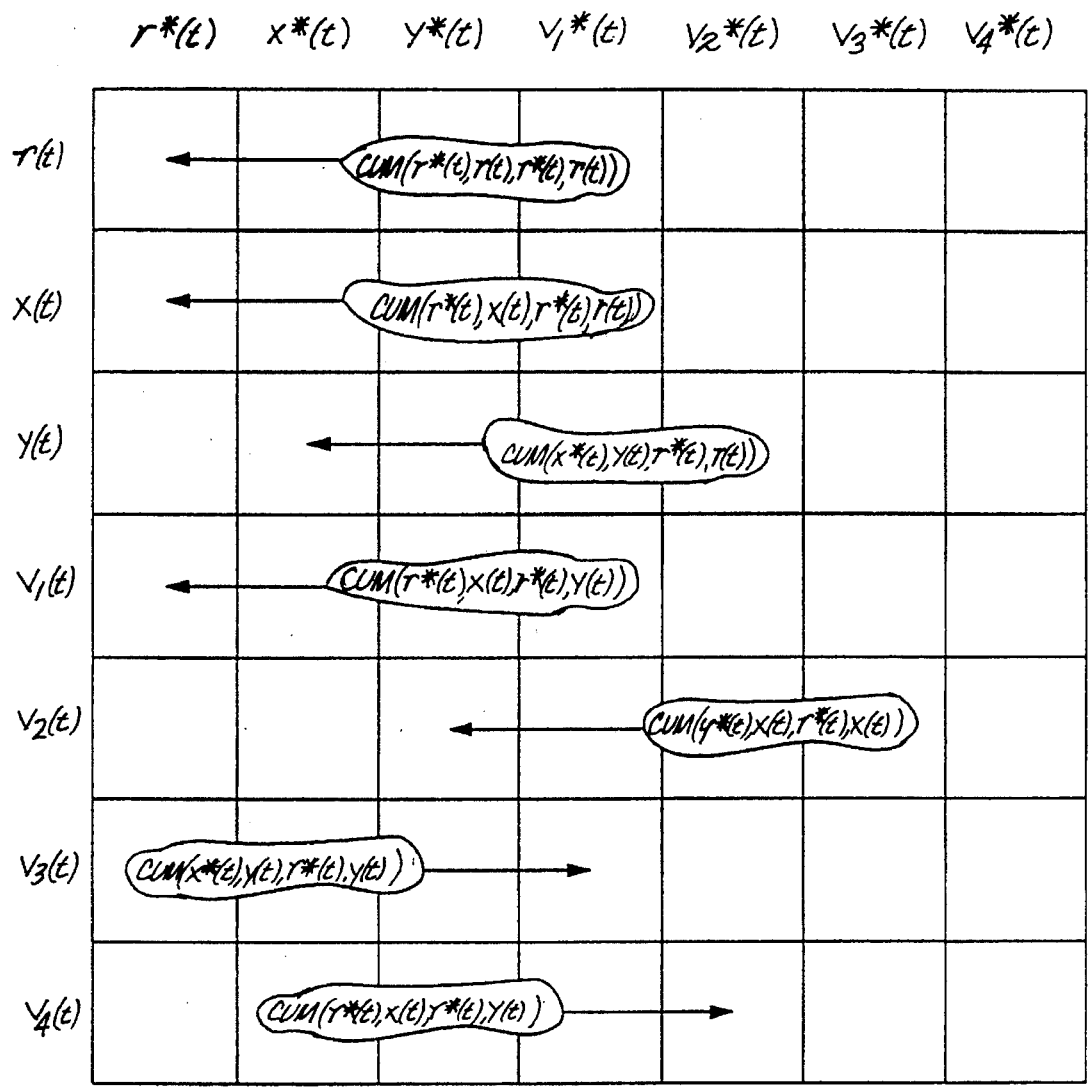
FIG. 15 demonstrates the calculation of higher-order statistics employed in the virtual cross-correlation computer for generating virtual second order statistics to be used in signal parameter estimation.

It should be noted that if all of the signals measured are circularly symmetric ($E\{s(t)s(t)\}=0$) then computation of these terms in the cumulant expression of Equation (1) are not required. Cross-correlations between actual sensors, between actual and virtual sensors, and between virtual sensors as identified by the representative Equations (11a, b and c) is conducted in the VC³ as described above for the first actual to virtual sensor cross-correlation. Construction of the matrix C to be produced by the VC³ for use in a direction finding processor is shown diagrammatically in FIG. 15. Upon the completion of these calculations the entire cross-correlations matrix for the entire array of real and virtual sensors described in FIG. 4 is available.

A covariance-based algorithm can estimate the DOA's of two sources using a three element array, whereas the cumulant-based virtual aperture extension described above can estimate the parameters of six sources (one less than the number of elements (actual and virtual) that form the aperture). In addition, the cumulant approach employed in the VC³ survives the presence of colored noise due to [CP4]. Additional detailed examples of different array configurations will be discussed subsequently.

As identified in Equation (11) it is possible to compute cross-correlations among the actual sensors through the use of cumulants, because cross-correlation is a "vector" and any vector can be expressed as the addition of the zero vector to itself. In other words, cross-correlation between two channels can be computed by using the two arguments of the fourth-order cumulant as required by correlation, and then using the remaining two arguments by repeating one of the channels twice, e.g., $$E\{x^*(t)y(t)\} = \frac{\sigma_s^2}{\gamma_{4,s}} \text{cum}(x^*(t), y(t), \underbrace{x^*(t), x(t)}_{\text{repeat}}) \quad (12)$$

The advantage of computing the cross-correlation of the signals x*(t) and y(t) using equation 12 is that additive Gaussian noise can be suppressed by the cumulant calculation. If the cross-correlation were computed directly it would be severely affected by additive Gaussian noise. This approach was previously recognized in the prior art described herein for suppression of Gaussian noise.

Joint Array Calibration and Parameter Estimation

Figure 6:
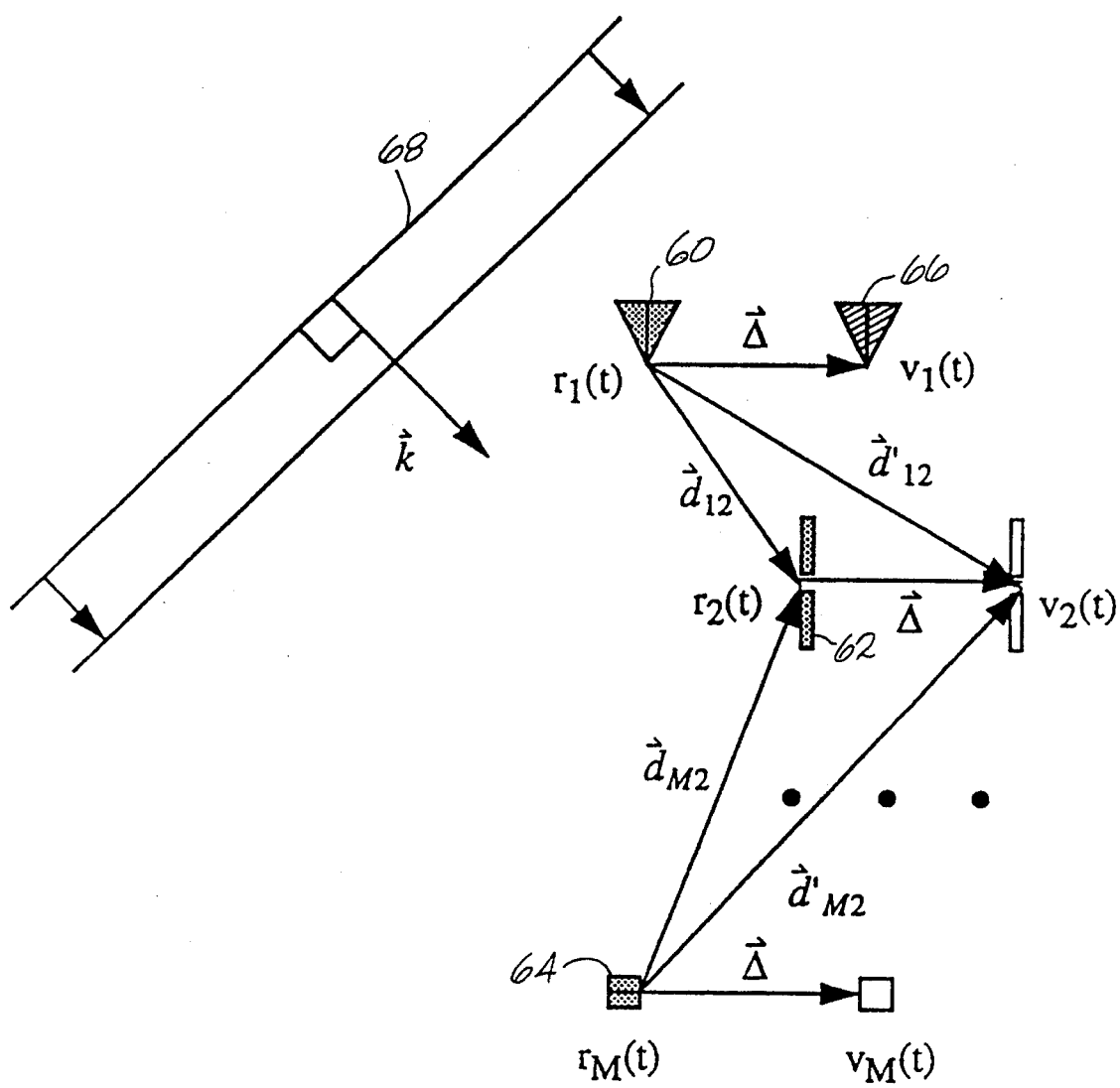
FIG. 6 is a diagram of an embodiment including an array employing actual and virtual sensors wherein the chosen virtual sensors form doublets with the actual sensors for generation of second-order statistics employable in a standard ESPRIT algorithm.

The virtual elements of an array created by the VC³ are employed in one embodiment of the present invention as shown in FIG. 6. Calibration of an array is a long-standing issue in the prior art. As previously described, the ESPRIT algorithm employs an array with an identical copy of the array displaced in space with a known displacement vector $\vec{\Delta}$. The capabilities of the VC³ allows the "copy" of the array for an ESPRIT application to comprise virtual sensor elements. A single sensor in addition to the desired array, with a known displacement vector, provides the capability for vector calculation of the remaining elements of the second array by the VC³ as virtual sensors. Referring to FIG. 6 the original array is represented by sensors 60, 62 and 64. The array may be of arbitrary size and element 64 represents the last sensor in the array. These sensors provide measurement signals $r_1(t)$ $r_2(t)$ and $r_M(t)$ respectively. An additional sensor 66 is provided at a known displacement and orientation with regard to sensor 60 and provides a signal $v_1(t)$. A wavefront 68 having a vector $\vec{k}$ impinges on the sensors in the array.

Considering the arbitrary array of FIG. 6 it is desired to employ an ESPRIT algorithm to jointly estimate the DOA parameters of multiple sources and the associated steering vectors. It is therefore necessary to compute the cross-correlations between sub-arrays resulting, for example, in the equation $$E\{r^*_1(t)v_M(t)\} = \sigma_s^2 a^*_1 a_M \exp(-j\vec{k} \cdot \vec{d}_{1M}) \exp(-j\vec{k} \cdot \vec{\Delta}) \quad (13)$$

where $a_M$ denotes the response of the Mth sensor to the wavefront from the source. If no additional sensors other than the original array are known it would not be possible to compute $v_M(t)$. However, it is known that $$E\{r^*_1(t)r_M(t)\} = \sigma_s^2 a^*_1 a_M \exp(-j\vec{k} \cdot \vec{d}_{1M}) = E\{r^*_1(t)v_M(t)\} \exp(j\vec{k} \cdot \vec{\Delta}) \quad (14)$$

is computable and related to the correlation in equation 13. If the term $e^{j \cdot \vec{k} \cdot \vec{\Delta}}$ was known, equation 14 could be solved for the term $E\{r^*_1(t)v_M(t)\}$. However, the propagation vector $\vec{k}$ is not known. If the additional element 66 is employed as shown in FIG. 6, it can be noted that all vectors joining two sensors in separate sub-arrays can be decomposed as the addition of two vectors, one in the actual sub-array, the other being the displacement vector $\vec{\Delta}$, e.g., $\vec{d}'_{12} = \vec{d}_{12} + \vec{\Delta}$. The computable correlation on the left-hand side of equation 14 lacks the common term $\exp(-j\vec{k} \cdot \vec{\Delta})$. The bridge between the sub-arrays to recover this phase term is provided by the additional sensor.

From the results previously described assuming that one doublet $\{r_1(t), v_1(t)\}$ (from sensors 60 and 66) is available, the cross-correlations between all sub-array elements can be calculated.

$$E\{r_k^*(t)v_l(t)\} = \frac{\sigma_s^2}{\gamma_{4,s}|a_1|^2} \text{cum}(r_1^*(t), v_1(t), r_K^*(t), r_l(t)) \quad (15)$$

Similarly, cross-correlation of the actual sensors can be computed by cumulants.

$$E\{r_k^*(t)v_l(t)\} = \frac{\sigma_s^2}{\gamma_{4,s}|a_1|^2} \text{cum}(r_1^*(t), v_1(t), r_K^*(t), r_l(t)) \quad (16)$$

finally, the cross-correlations between virtual-sensors can be computed as:

$$E\{v_k^*(t)v_l(t)\} = \frac{\sigma_s^2}{\gamma_{4,s}|a_1|^2} \text{cum}(r_2^*(t), r_2(t), r_K^*(t), r_1(t)) \quad (16')$$

Equations 15 and 16 are used to form the covariance matrix required for use of the ESPRIT algorithm in calculating estimated parameters for direction of arrival. The combination of the $VC^3$ with an ESPRIT parameter estimation system may be characterized as a virtual ESPRIT or VESPA. The VESPA embodiment of the present invention requires only a single doublet rather than a full copy of the array as required by the prior art ESPRIT parameter estimation system. This results in enormous hardware reductions. VESPA further alleviates the problems resulting from the perfect sampling synchronization requirements of the covariance ESPRIT for the two sub-arrays. In VESPA, synchronization must be maintained only between the elements of the single doublet. As previously described with regard to FIG. 5 true cumulants are replaced by consistent estimates which converge to true values as the data length grows to infinity. Prior art indicates that this approach provides rapid convergence to the true values at high signal to noise ratio (SNR). See, Moulines, E. & Cardoso, J. F., "Direction-Finding Algorithms Using 4th-Order Statistics: Asymtotic Performance Analysis" *Proceedings ICASSP-92*, Vol. 2, pp. 437-440, March 1992.

This embodiment of the invention employing 4th-Order cumulants which are blind to Gaussian processes provides significant advantage over the prior art as identified in Rockah, Y. & Schultheiss, P. N., "Array Shaped Calibration Using Sources In Unknown Locations—Part 1: Far-field Sources," *IEEE Transactions in Acoustics, Speech, Signal Processing*, Vol. ASSP-35, No. 3, pp. 286-299, March 1987. The disclosed embodiment allows multiple sources sharing the same frequency band based on [CP3] and is applicable to arbitrary arrays. Further, the embodiment shown is applicable to nominally linear arrays. The cumulant based approach does not require information about noise spatial correlation, unlike a covariance based algorithm and, employing $VC^3$, the embodiment provides an approach which is non-iterative and eliminates parameter search by using ESPRIT. In addition, in the presence of white observation noise, the present embodiment provides better estimates using a maximum likelihood approach proposed in Weiss, A. & Friedlander, B., "Array Shaped Calibration Using Sources in Unknown Locations-A Maximum Likelihood Approach," *IEEE Transactions in Acoustics, Speech, Signal Processing*, Vol. ASSP-37, No. 12, pp. 1958-1965, December 1989. In the presence of colored Gaussian noise, the present embodiment may be employed using a trispectral maximum likelihood approach to calibrate arbitrary arrays without knowledge of noise color.

Recovery of waveforms associated with far-field sources is accomplished using the disclosed embodiment of the invention by first estimating the steering vectors by subspace rotation as defined in Roy, R. and Kailath, T. "ESPRIT-Estimation of Signal Parameters via Rotational Invariance Techniques," *Optical Engineering*, Vol. 29, No. 4, pp. 296-313, April 1990. Referring to FIG. 6 and generalizing, the measured signals are represented as $r(t)=[r_1(t),r_2(t), \ldots ,r_M(t),v_1(t)]^T$ for the actual sensors in the array. The steering matrix is augmented by the estimated response of the added sensor 66 which provides signal measurement $v_1(t)$. If $a_1$ is the $(M+1)\times 1$ steering vector of the signal of interest (SOI) characterized as $s_1(t)$ with estimated bearing $\theta_1$ and the augmented steering matrix is decomposed as $A=[a_1, A_I]$, two approaches may be used for signal recovery.

A minimum-variance distortionless response beamformer (MVDR) is employed to estimate the SOI waveform in the mean-square sense.

$$\hat{s}_1(t)=w_1^H r(t)=(R^{-1}a_1)^H r(t) \quad (27)$$

where $R=E\{r(t)r^H(t)\}$

The second approach for signal recovery employs MVDR with perfect nulling (Null-MVDR). This beamformer estimates the SOI waveform in the mean square sense while putting perfect nulls on the interferors.

$$\hat{s}_2(t)=w_2^H r(t) \quad (18)$$

where the weight vector $w_2$ is the solution of the linear-constrained minimum variance problem $$w_2 = \min_{w} w^H R w \text{ subject to } [a_1, A_I]^H w = f \begin{bmatrix} 1 \\ 0 \\ \cdot \\ \cdot \\ \cdot \\ 0 \end{bmatrix} \quad (19)$$

which has the solution $$w_2=R^{-1}A(A^H R^{-1}A)^{-1}f \quad (20)$$

It should be noted that both the MVDR and null MVDR beamformers do not require knowledge of the measurement noise covariance matrix.

Figure 7:
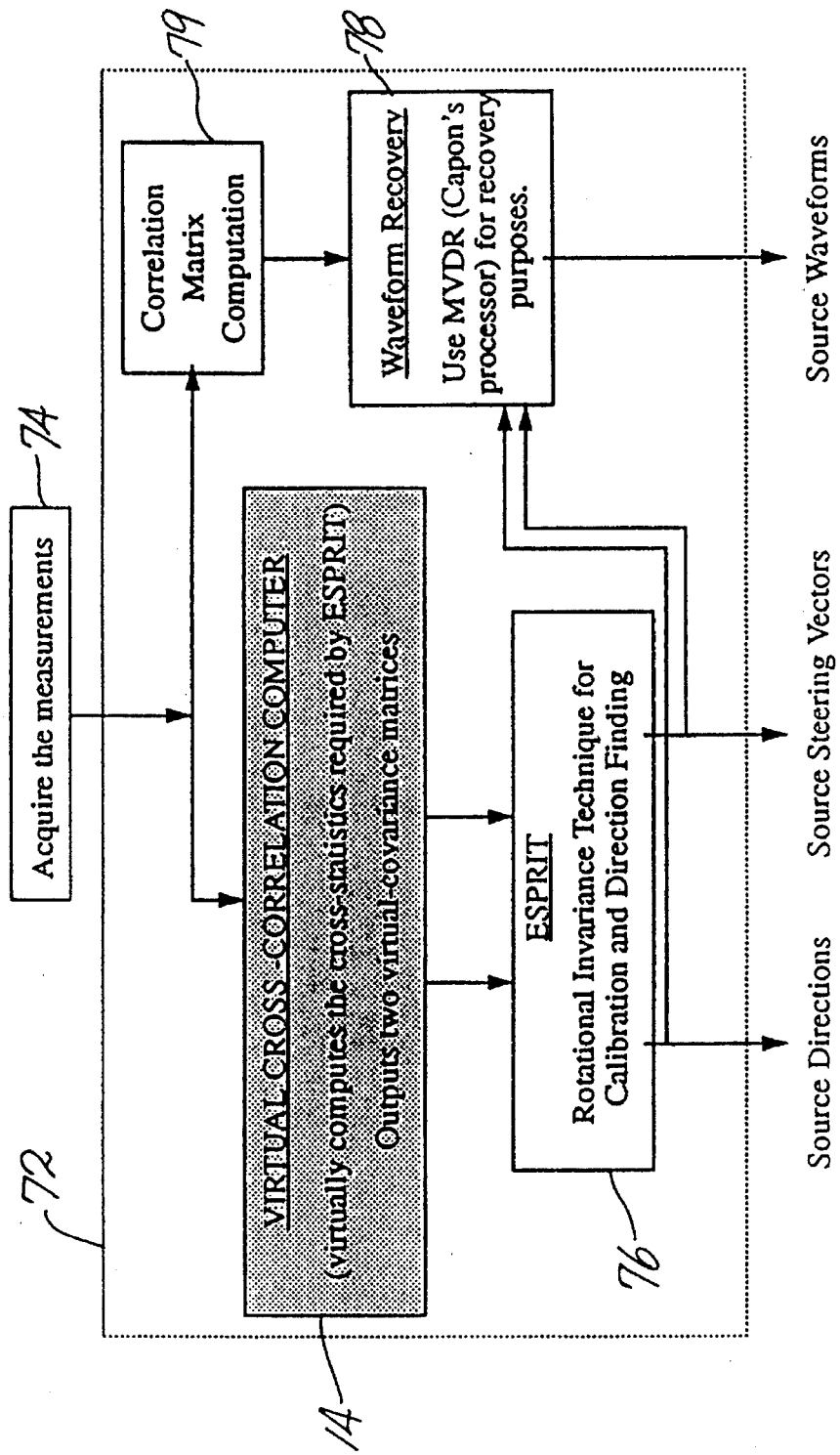
FIG. 7 is a block diagram identifying the interrelationship of the virtual cross-correlation computer of the present invention with standard subspace algorithms for parameter estimation including source direction, source steering vectors and source waveforms.

FIG. 7 shows a block diagram of the VESPA system employing the $VC^3$ to provide covariance matrices for direction finding and waveform recovery. The VESPA system generally designated 72 receives the measurements as acquired from the sensors 74. The actual measurements and virtual sensor statistics are employed by the $VC^s$ 14 to provide two virtual covariance matrices to the ESPRIT subspace parameter estimation system 76. The ESPRIT system provides source direction and source steering vectors, both of which are employed in a waveform recovery calculator 78 which receives additional input from a correlation matrix computation 79 to provide the source waveform employing the MVDR process previously described.

Suppression of Non-Gaussian Noise

If the sensor array employed by the present invention comprises (1) isotropic elements (2) and is illuminated by multiple independent non-Gaussian sources and (3) it is assumed that the array measurements are contaminated by non-Gaussian sensor noise which is independent from sensor to sensor and (4) noise components can have varying power and kurtosis over the aperture, the present invention can still estimate DOA parameters of far-field sources by subspace techniques. Variations of noise power and kurtosis over the sensors pose no problem for determining the signal subspace and it is possible to achieve virtual aperture extension as previously described. The invention achieves this capability based on the assumptions made about the structure of the non-Gaussian noise. Since the far-field sources are independent, their second and higher-order statistics are spatially stationary implying that auto-correlations and auto-cumulants of signals do not vary over the aperture. Since the noise is independent between array elements, computation of the cross statistics is possible regardless of noise, and computation of the auto-correlation at a sensor in the presence of noise is accomplished employing the following equation $$\text{(with non-Gaussian noise) cum}(r^*(t), x(t), x^*(t), r(t)) = \quad (21)$$

$$\frac{\gamma_{4,s}}{\sigma_s^2} E\{r(t)r^*(t)\} \text{ (no noise)}$$

The left side of equation 21 is computed in a scenario where additive non-Gaussian noise is present. The right side of equation 21 is computed in the hypothetical (virtual) case where there is no measurement noise. This convention will be maintained throughout the following discussion of noise suppression. It is important to note that equation 21 is valid for ensemble averages. With finite samples the standard deviations of the two sides will be different.

Equation 21 can be interpreted geometrically. With cumulants the geometric effect is motion from one sensor to another sensor, which has non-Gaussian but independent noise, and back to the starting sensor using the same path. Previous use of higher-order statistics for accomplishing non-Gaussian noise sensitivity in this manner was proposed in Cardoso, J. F., "Higher-Order Narrow Band Array Processing," *Proceedings of the International Conference on Higher-Order Statistics*, pp. 121–130, Chamrousse France Jul. 10–12, 1991. The limitation in noise reduction employing this method relates to the assumption of sensor-to-sensor independence of the non-Gaussian noise. Employing virtual aperture extension of the present invention the cumulants are computed for different sensor measurements. Consequently, the cumulants which are used for aperture extension (the virtual sensors) are insensitive to non-Gaussian noise which is independent from sensor-to-sensor.

Figure 8:
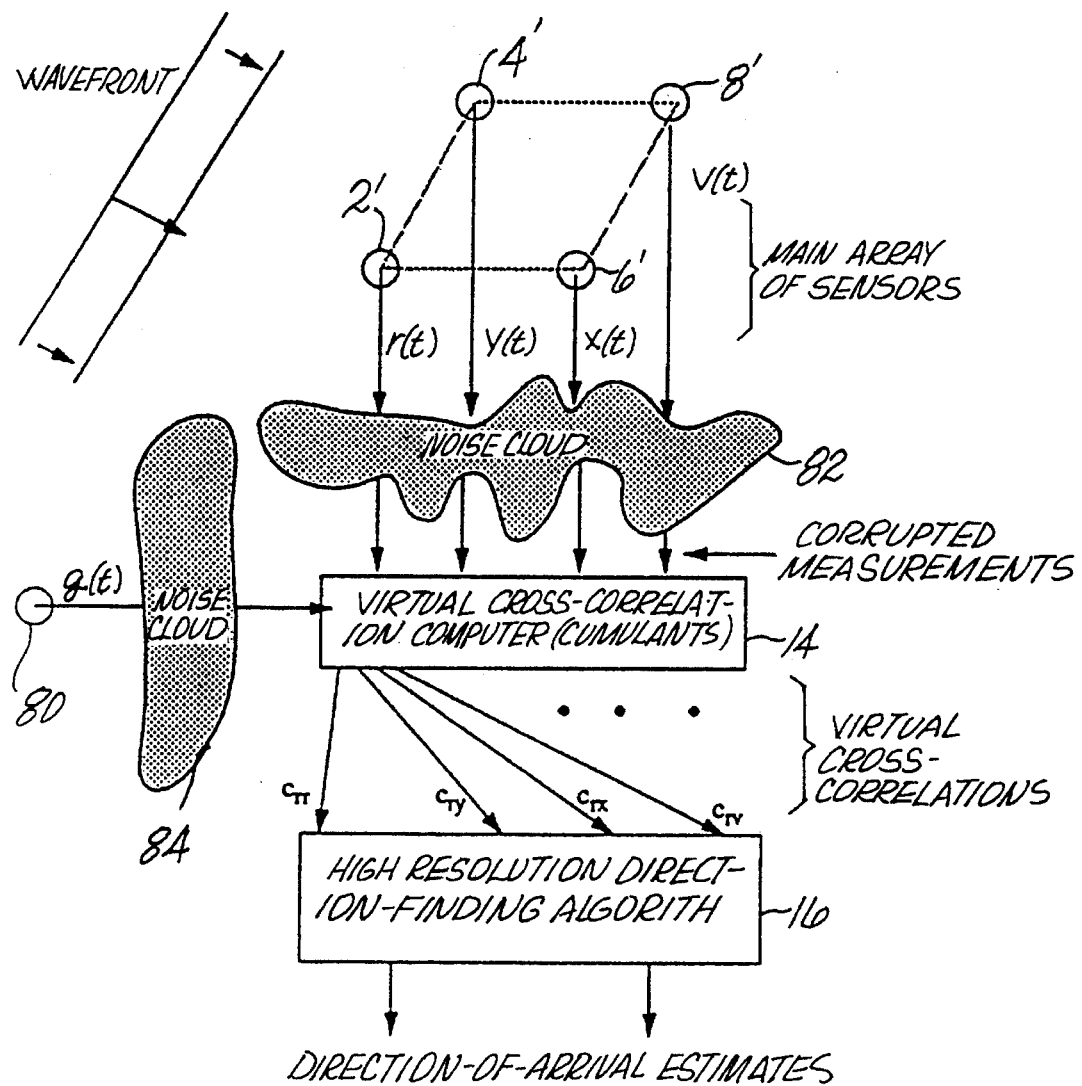
FIG. 8 is a schematic block diagram of another embodiment of the invention employing an actual sensor separate from the array and providing data to the virtual cross-correlation computer for elimination of noise in the calculation of virtual second-order statistics of the array.

Additional noise reduction capability employing the present invention is accomplished through another embodiment of the invention as shown in FIG. 8. The actual sensors of the array 2', 4' and 6' are supplemented by a separate sensor 80. The signals from the sensors r(t), y(t) and x(t) are provided to the $VC^3$ 14, however the signals are corrupted by a noise cloud 82. The signal from the separate sensor g(t) is also provided to the $VC^3$ corrupted by a separate noise cloud 84. For the embodiment of the invention shown in FIG. 8, it can be assumed that the array of arbitrary sensors is illuminated by multiple linearly-correlated non-Gaussian sources. The noise cloud contaminates the measurements with noise of arbitrary cross statistics. The separation of the separate sensor 80 from the array allows the additional assumption that the contamination of the sensor measurement g(t) by noise cloud 84 is independent of the noise component of the other sensors. If the array comprises M sensors which measure $\{x_k\}_{k=1}^M$ then because $$\text{(with non-Gaussian noise) cum}(x_j^*(t), g(t), g^*(t), x_k(t)) = \quad (22)$$

$$\text{-continued}$$

$$\frac{\gamma_{4,s}|g_s|^2}{\sigma_s^2} E\{x_j^*(t)x_k(t)\} \text{ (no noise)}$$

Equation 22 allows calculation of the second order statistics as if the noise cloud for the original array were not present. Equation 22 can be interpreted as follows: to implement $E\{x^*_j(t)x_k(t)\}$ first move from $x_j(t)$ to the separate sensor providing the signal g(t). Then return from the separate sensor to the sensor having the signal $x_k(t)$. The array covariance matrix $\underline{\Delta} E\{x(t)x^H(t)\}$ can be constructed as $$R = A\Gamma A^H \quad (23)$$

where A is the steering matrix for M sensors and $\Gamma$ is a diagonal matrix whose kth diagonal entry is $\gamma_{4,k}|g_k|^2$ and $g_k$ is the response of the separate sensor to the kth source (the row vector g can be defined as the collection of responses). Any subspace method may be applied to R whose elements are computed using equation 22. Even in the presence of colored non-Gaussian noise there is no need to know the response of the separate sensor to the far-field sources although it must be non-zero. The time series recorded by the separate sensor provides the information necessary for the $VC^3$.

Consider source signals s(t) correlated in the following way $$S(t) = Qu(t) \quad (24)$$

where Q is non-singular (but arbitrary), and components of u(t) are independent. Let B=AQ and h=gQ; then R, computed as described in (22), for the independent sources scenario, takes the form:

$$R = B\Gamma B^H \quad (25)$$

where $\Gamma$ is a diagonal matrix whose kth diagonal entry is $\tilde{\gamma}_{4,k}|h_k|^2$ and $\tilde{\gamma}_{4,k}$ is the fourth-order cumulant of $u_k(t)$. Note that $Q\Gamma Q^H$ is full-rank, so that R, expressed as $$R = A(Q\Gamma Q^H)A^H \quad (26)$$

maintains all the requirements for use of subspace algorithms like MUSIC and ESPRIT for direction finding. The structure of FIG. 8 allows such direction finding even in the presence of correlated sources, correlated non-Gaussian noise and arbitrary array characteristics.

Figure 9:
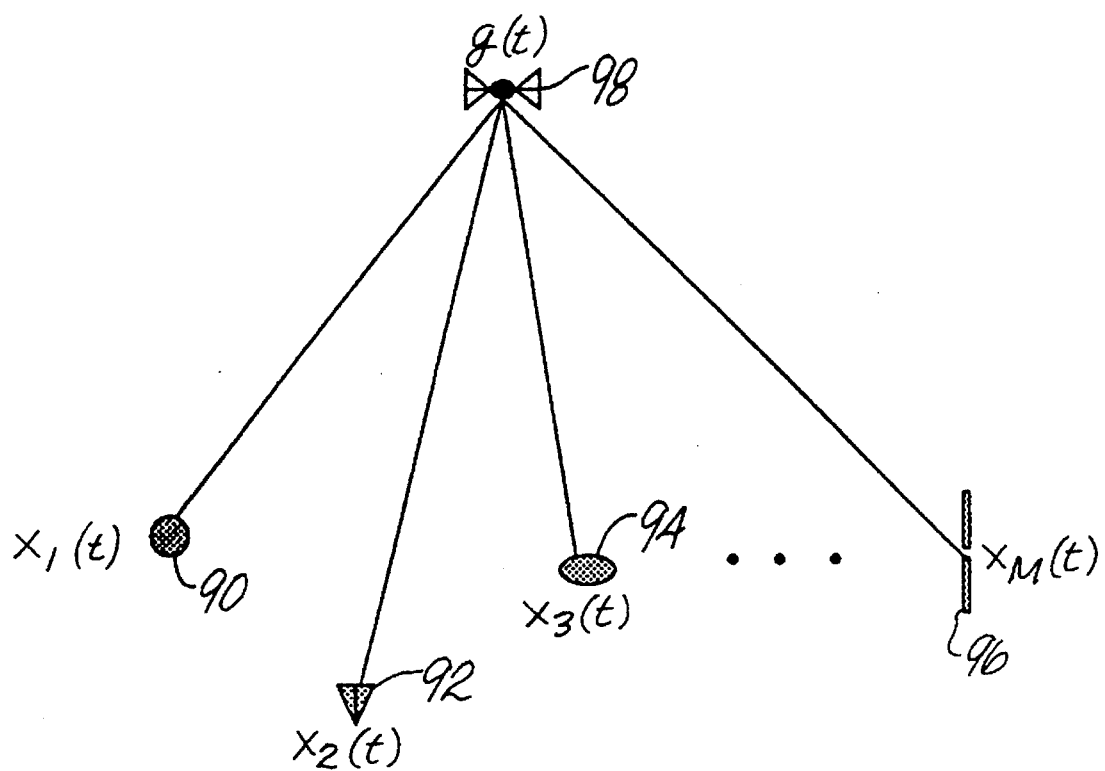
FIG. 9 demonstrates an embodiment of the invention employing the separate sensor as identified in FIG. 8 for a communication system application employing a satellite sensor for noise suppression.

The embodiment of FIG. 8 is employable in a communications scenario as shown in FIG. 9 wherein the array of M sensors comprises a plurality of communications receivers 90, 92, 94 and 96 with multiple intermediate sensors not shown wherein the signal measurements by the sensors comprise $x_1(t)$ through $x_M(t)$ and the separate sensor comprises a satellite sensor 98. The applications of the embodiment of the invention described with respect to FIG. 8 are equally applicable to the embodiment of FIG. 9 wherein the geometrical interpretation of the equation 22 with respect to the satellite sensor comprises vector motion from a source to the satellite sensor which then distributes the message (i.e., returning from the satellite sensor to a second source ($x_j(t)$ to g(t) and returning from g(t) to $x_k(t)$).

With the embodiment of the invention as shown in FIGS. 8 and 9, if the original array is linear and consists of uniformly spaced sensors of identical response estimation of the parameters of coherent sources (i.e., when Q is singular) is possible through a spatial-smoothing algorithm on the covariance matrix of equation 26 as proposed in Shan, T. and Kailath, T., "Adaptive Beam Forming for Coherent Signals and Interference" *IEEE Transactions on Acoustic Speech Signal Processing*, Vol. ASSP—33, No. 3, pp. 527–536, Jun. 1985.

The separate sensor embodiment may be extrapolated in additional embodiments of the present invention by adding a second separate sensor and employing the VESPA for both calibration of the manifold array and non-Gaussian noise reduction wherein the two separate sensors comprise the doublet for the VESPA.

This can be demonstrated by considering $x_1(t), x_2(t) \ldots x_M(t)$, to be the measurements from an arbitrary array. If it is assumed that an identical copy of the first sensor (that measures $x_1(t)$), whose noise component is independent of the remainder of the sensors, is denoted as $g(t)$, where $a_s$ denotes the response of the first sensor to the wavefront, then considering the modified array, which consists of the measurements $\{g(t), x_2(t), \ldots, x_M(t)\}$, the VESPA autocorrelation matrix for the measurements $\{x_k(t)_{k=2}{}^M\}$ can now be generated as (non-Gaussian noise)

$$(\text{non-Gaussian noise}) \text{cum}(x_k{}^*(t), g(t), g^*(t), x_l(t)) = \qquad (27)$$

$$\frac{\gamma_{4,s}|a_s|^2}{\sigma_s^2} E\{x_k{}^*(t)x_l(t)\} \text{ (no noise)}$$

where $2 \leq k, 1 \leq M$. This is in fact the idea presented for non-Gaussian noise suppression in equation 22: we first move to the satellite sensor $g(t)$ and then come back. A slight modification of this idea can be used to compute the VESPA cross-correlation matrix. Let $v_1(t)$ denote the virtual-process received by the virtual-twin of $x_1(t)$ where $2 \leq 1 \leq M$. We can compute $$(\text{non-Gaussian noise}) \text{cum}(x_k{}^*(t), g(t), x_l{}^*(t), x_l(t)) = \qquad (28)$$

$$\frac{\gamma_{4,s}|a_s|^2}{\sigma_s^2} E\{x_k{}^*(t)v_l(t)\} \text{ (no noise)}$$

although $v_i(t)$ is not physically available. Finally, cross-correlations between virtual sensor measurements are identical to the cross-correlations between actual sensors (since the sources are independent, fourth-order statistics are spatially stationary).

Minimum Redundancy Array Design

The advantages of the present invention in creating arrays with minimum redundancy of sensors is clear based on the availability of "virtual" sensors in the system. virtual sensors may be employed to replace actual sensors to reduce hardware costs or to increase the capability of an existing array through processing with a $VC^3$ as identified in the present invention. FIG. 4 disclosed the potential virtual sensor locations for an array comprised of three actual sensors. FIG. 10 discloses a circular array which in the prior art would require nine sensors 100. By application of processing employing a $VC^3$ as defined in the present invention the actual sensors in the array may be reduced to five as designated by 100' while four virtual sensors 102 replace actual sensors in the original array as shown in FIG. 10.

Figure 11:
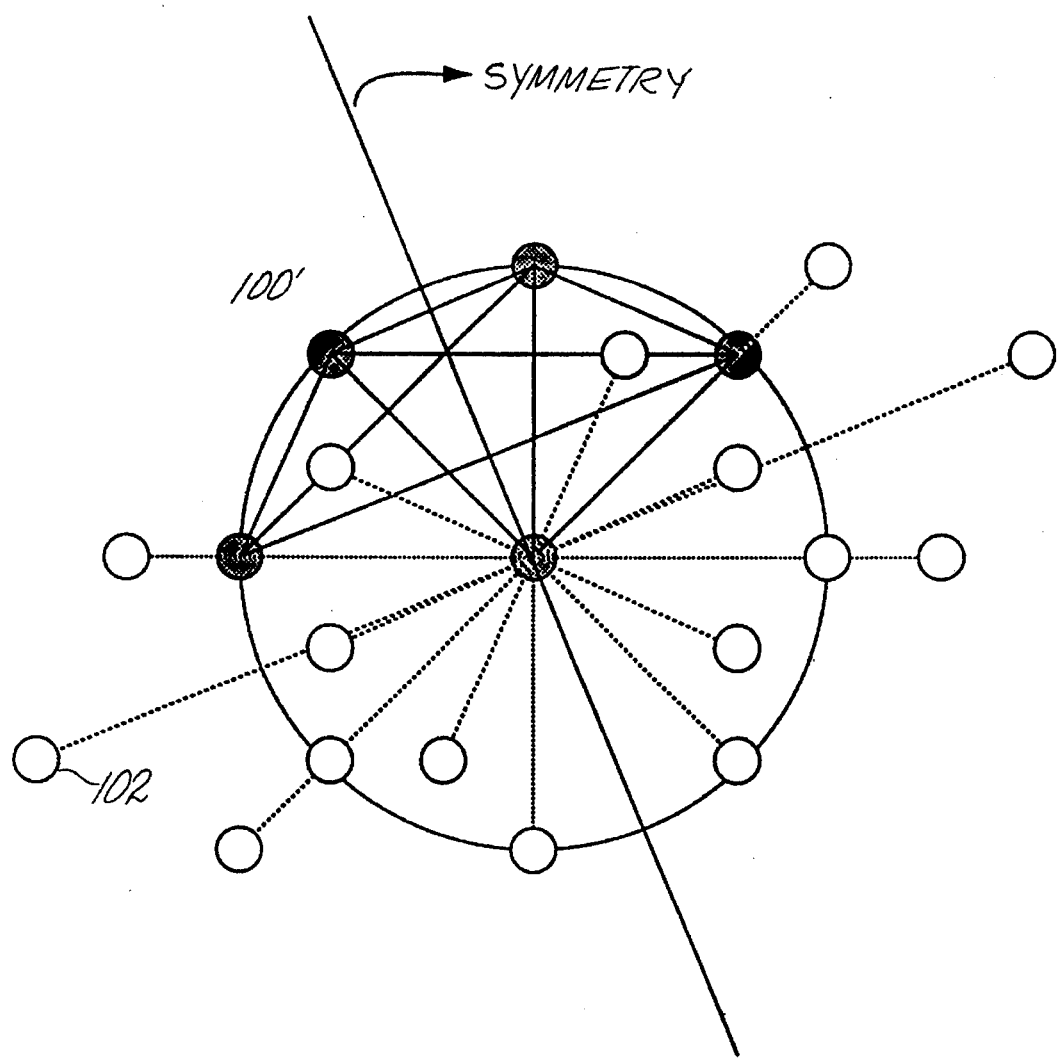
FIG. 11 demonstrates an extension of the virtual array of FIG. 10 wherein all virtual sensors available based on the actual sensors present are demonstrated.

FIG. 11 discloses a further extension of the circular array of FIG. 10 wherein all possible virtual sensors 102 are shown. In all, 16 additional virtual sensors may be employed in the array based on the five actual sensors present. Referring again to the geometrical interpretation of the $VC^3$ of the present invention employing cumulants for higher-order statistics the virtual locations are obtained by picking one of the six possible vectors among the four actual sensors on the circle (excluding the sensor at the center) and attaching this vector to the sensor at the center. There are two ways to accomplish this vector addition, hence 16 new locations are possible. Since these 16 new locations communicate with the sensor with only one vector they communicate with sensors of the previous design (virtual sensors on the circle) see FIG. 10(b) with at most two jumps implying that the aperture can be extended to 21 elements using cumulants in a $VC^3$ as defined by the present invention.

Analytically it can be shown that for fourth order cumulants the aperture of an arbitrary array of M sensors can be increased to at least of 2M–1 sensors. In other words, it is possible to double the aperture of an existing array.

Aperture extension is upper bounded by the equation $M^2-M+1$ for an array of M isotropic sensors.

Figure 12:
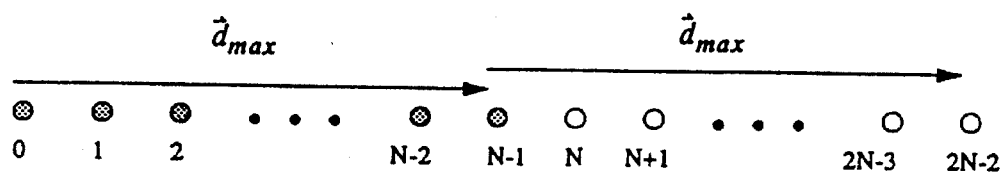
FIG. 12(a) is a diagram of a linear array having an extended aperture of virtual sensors.
FIG. 12(b) is a diagram of a rectangular array and the corresponding virtual array available through use of a virtual cross-correlation computer as identified in the present invention.
Figure 12:
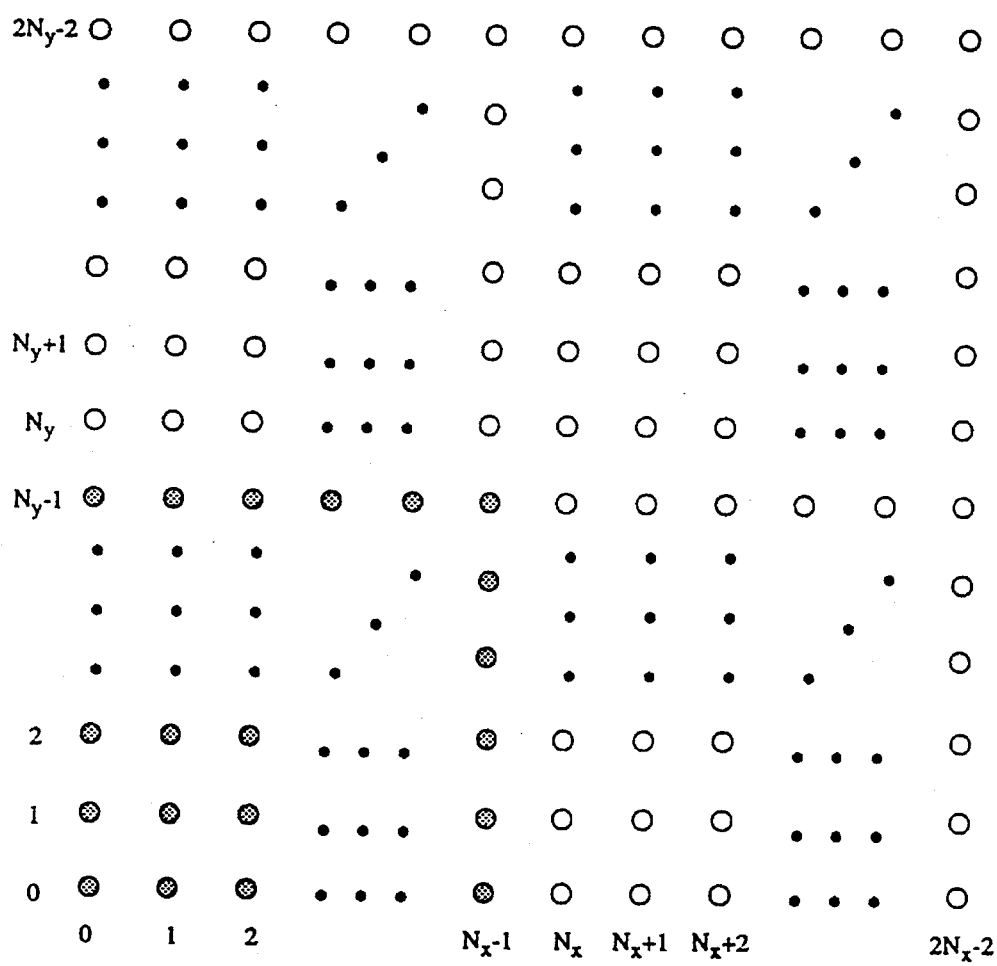
Figure 13A:
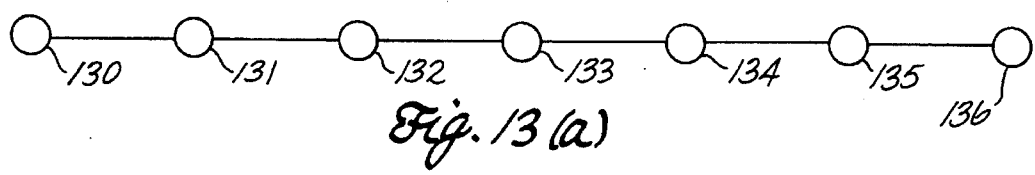
FIGS. 13a and b demonstrate the elimination of redundant sensors in a uniform linear array by use of virtual sensors calculated by the virtual cross-correlation computer of the present invention.
Figure 13B:
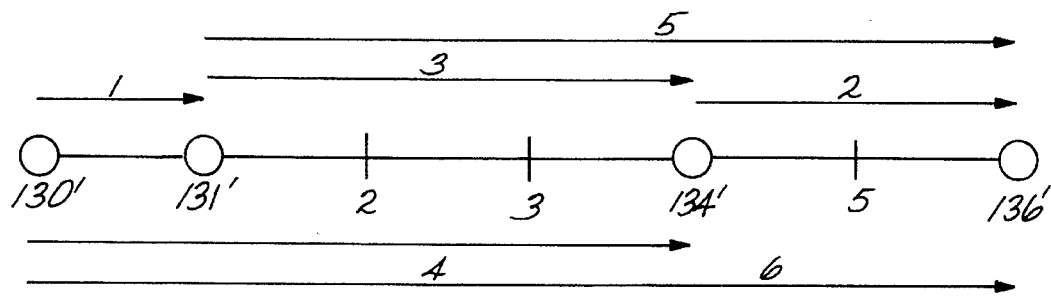

The application of minimum redundancy arrays is equally applicable to linear and rectangular arrays. For a linear array as shown in FIG. 12a consider an array of M isotropic sensors. It has been demonstrated in the prior art in Shamasunder, S. and Giannakis, G., "Modeling of Non-Gaussian Array Data Using Cumulants" *IEEE Transactions on Signal Processing*, March 1993, that the aperture can be extended to 2M–1 elements. Employing the present invention the linear array shown in FIG. 13(a) of seven elements 130–136 may be reduced to four elements 130', 131', 134' and 136' while elements 132, 133 and 135 are replaced by virtual sensors as shown in FIG. 13(b). The constraint on the array of FIGS. 12 and 13 is that the linear array be uniform with identical sensors separated by $\lambda/2$. The vectors identified in FIG. 13(b) demonstrate the addition vectors available from the actual array for the geometrical construction of the virtual sensors in the virtual array.

Figure 14:
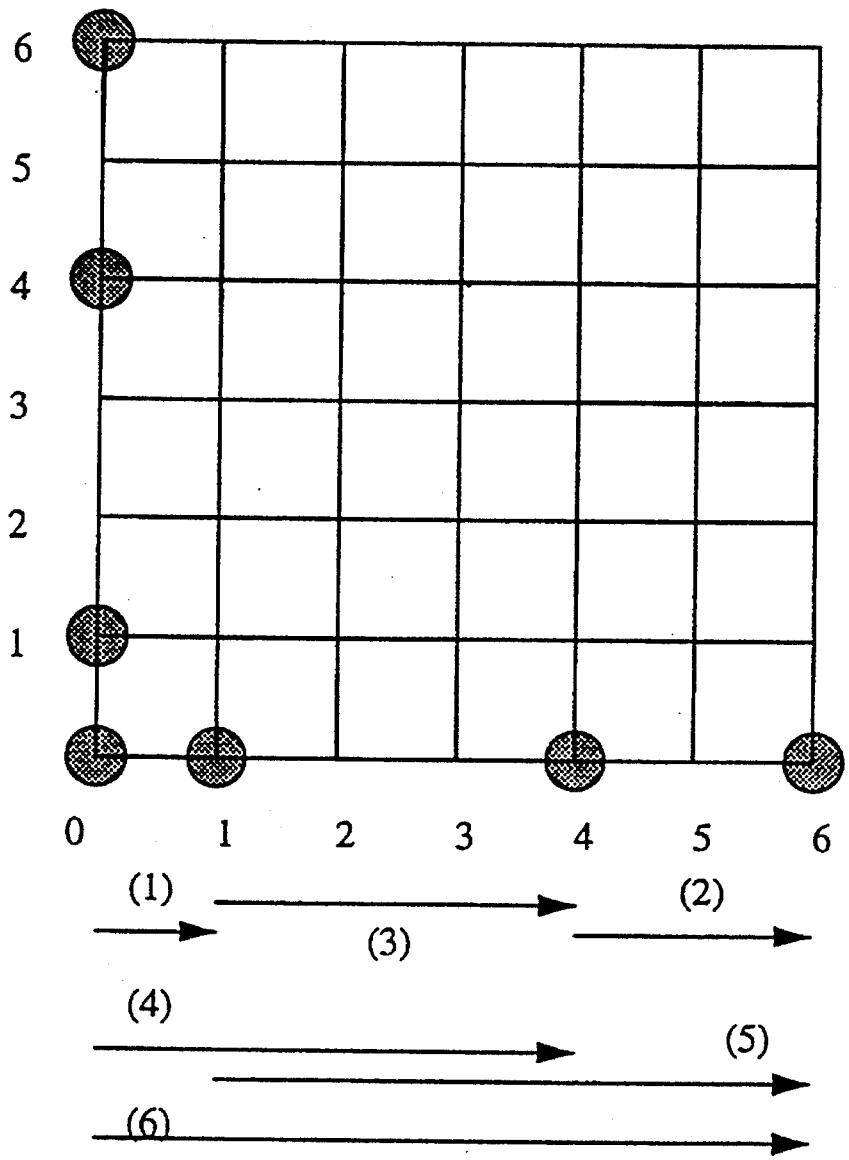
FIG. 14 is a diagram demonstrating minimum redundancy array design wherein a rectangular virtual array pattern is accomplished employing selected actual sensors located on the border of the virtual array.

Extending the concept for the linear array to two dimensions as shown in FIG. 14, a rectangular array is shown employing two perpendicular linear arrays of the design shown in FIG. 13(b). The $VC^3$ of the present invention allows computation of cross-correlations among all 49 grid points of the virtual array using the data available from the seven real sensors. The set of vectors available for generation of the virtual locations for one dimension are shown in FIG. 14 and a vector set perpendicular to the vector shown for the perpendicular linear array provides the additive vectors for the virtual sensors. Returning to FIG. 12(a), a linear array as shown in FIG. 12 may also be expanded to a rectangular array (FIG. 12(b)) wherein a fully redundant rectangular array ($M_x \cdot M_y$ sensors) is extendable employing a $VC^3$ as defined for the present invention which allows for generation of virtual sensors to provide an effective aperture of $(2M_x-1)(2M_y-1)$ sensors.

The advantages of the present invention have been demonstrated and the invention fully disclosed, as required by the patent statutes, in the foregoing specification. Those skilled in the art will recognize substitutions and modifications for the elements defined in those embodiments to accommodate the requirements of particular applications. Such modifications and substitutions are within the scope and intent of this invention as defined by the following claims.

What is claimed is:

1. A signal parameter estimation system for multiple signal sources comprising:

a plurality of actual sensors comprising a partial array receiving signals from the multiple sources, each sensor providing as an output a measurement;

a virtual cross-correlation computer receiving the measurements from the actual sensors and including means for calculating the cumulants of the actual sensor signals and means for calculating the cumulants of virtual sinsors characterized as summations of displacement vectors between pairs of actual sensors within the plurality, the virtual sensors comprising a second partial array and means for outputting a covariance matrix comprising the cumulant values corresponding to each cross-correlation of a full array comprising the partial array of actual sensors and the second partial array of virtual sensors; and a subspace parameter estimation system receiving the covariance matrix of the full array and calculating direction of arrival estimates.

2. A system as defined in claim 1 wherein the subspace parameter estimation system comprises an ESPRIT system.

3. A system as defined in claim 1 wherein the subspace parameter estimation system comprises an MUSIC system.

4. A signal parameter estimation system for multiple signal sources comprising:

a first plurality of actual sensors comprising a partial array receiving the signals from the multiple sources and providing signal measurement functions as an output;

an additional guiding sensor identical to and located at a known displacement vector from one sensor of the first plurality said additional sensor generating a signal measurement function as an output;

a virtual cross-correlation computer receiving the signal measurement functions from the first plurality of actual sensors and the additional guiding sensor said virtual cross-correlation computer including means for calculating the cumulants of the actual sensors of the first plurality and means for calculating the cumulants of virtual sensors characterized by the addition of vectors between adjacent sensors of the first plurality and the known displacement vector, and means for outputting a covariance matrix corresponding to the calculated cumulants of the first plurality of actual sensors and a second covariance matrix corresponding to the virtual sensors and the additional guiding sensor; and a subspace parameter estimation system receiving the two covariance matrices from the virtual cross-correlation computer and determining direction of arrival.

5. A system as defined in claim 4 wherein the subspace parameter estimation system comprises an ESPRIT system.

6. A system as defined in claim 5 wherein the ESPRIT system further supplies source steering vectors and the system further comprises means for computing a correlation matrix of the signal measurement functions and a beamformer receiving from the ESPRIT system the direction of arrival and source steering vectors and the correlation matrix for calculation of a source wave form.

7. A signal parameter estimation system for multiple signal sources comprising:

a plurality of actual sensors comprising a partial array receiving signals from the multiple sources and providing signal measurement functions;

a separate sensor located remotely from the plurality of actual sensors and providing a signal measurement function;

a virtual cross-correlation computer receiving the signal measurement functions from the plurality of actual sensors and the separate sensor said virtual correlation computer including means for calculating cumulants of the actual sensors, means for calculating cumulants of subsets of the actual sensors and the separate sensor, means for calculating cumulants of virtual sensors characterized by addition of vectors between the actual sensors, and means for outputting covariances matrices corresponding to the calculated cumulants for a full array comprising at least one subset of actual sensors and at least one of said virtual sensors; and and a subspace parameter estimation system receiving the covariance matrices and calculating direction of arrival estimates.

8. A signal parameter estimation system for multiple separate independent signal sources comprising:

a plurality of actual sensors comprising a partial array receiving signals from the separate independent sources and providing signal measurement functions as an output;

a first separate actual sensor located remotely from the plurality of actual sensors said separate sensor providing a signal measurement function as an output;

a second separate sensor located proximate 1 of the actual sensors located with a known displacement vector therefrom and being substantially identical thereto and providing a signal measurement function as an output;

a virtual cross-correlation computer receiving the signal measurement functions from the sensors and including means for calculating the cumulants of the plurality of actual sensors, means for calculating the cumulants of subsets of the plurality of actual sensors, the first separate sensor and the second separate sensor, means for calculating cumulants of virtual sensors characterized by addition of vectors between the actual sensors and the known displacement vector, and means for outputting covariance matrices corresponding to the cumulants calculated for a full array comprising at least one of said subsets and at least one virtual sensor; and a subspace parameter estimation system receiving the covariance matrices from the virtual cross-correlation computer and computing direction of arrival estimates and estimating the array geometry for the actual sensors.

9. A system as defined in claim 8 wherein the subspace parameter estimation system comprises an ESPRIT system.

* * * * *

UNITED STATES PATENT AND TRADEMARK OFFICE
CERTIFICATE OF CORRECTION

PATENT NO. : 5,459,668

DATED : October 17, 1995

INVENTOR(S) : Mithat C. Dogan; Jerry M. Mendel

It is certified that error appears in the above-indentified patent and that said Letters Patent is hereby corrected as shown below:

Column 2, line 15, change "approches" to
-- approaches --.

Column 3, line 62, change "FIG. 10" to
-- FIGS. 10a and 10b --.

Column 4, line 6, change "invention." to
-- invention; --.
Column 4, line 49, change "$(VC^3)^{14}$" to -- $(VC^3)14$ --.

Column 5, line 52, change "forth" to -- fourth --.

Column 7, line 33, change "$\sigma_x^2$" to -- $\sigma_s^2$ --.

Column 10, line 18, change "(27)" to -- (17) --.
Column 10, line 23, change "interferors" to
-- interferers --.
Column 10, line 50, change "$VC^s$" to -- $VC^3$ --.

Column 11, line 37, after "Chamrousse" insert a comma.
Column 11, line 64, after "then" delete "because".

Column 12, line 12, after "matrix" change "$\underline{A}E\{x(t)x^H(t)\}$"
to -- $R\underline{A}E\{x(t)x^H(t)\}$ --.
Column 12, lines 35, 37, 39, 42, change "$\Gamma$" to -- $\tilde{\Gamma}$ --
(all occurrences).

UNITED STATES PATENT AND TRADEMARK OFFICE
CERTIFICATE OF CORRECTION

PATENT NO. : 5,459,668
DATED : October 17, 1995
INVENTOR(S) : Mithat C. Dogan; Jerry M. Mendel It is certified that error appears in the above-indentified patent and that said Letters Patent is hereby corrected as shown below:

Column 13, line 11, change "$x_1(t), x_2(t)...$" to
-- $x_1(t), x_2(t), ...,$ --
Column 13, line 20, delete "(non-Gaussian noise)".
Column 13, line 41, change "$V_i(t)$" to -- $V_1(t)$ --.
Column 13, line 49, change "virtual" to -- Virtual --.

Column 15, line 18, change "an" to -- a --.

Column 16, line 20, before "a subspace" delete "and".

Signed and Sealed this

Third Day of September, 1996

BRUCE LEHMAN

*Attest:*

*Attesting Officer*   Commissioner of Patents and Trademarks